Dec. 28, 1954  G. BAECHLI  2,698,077
SUSPENSION TROUGHING IDLER
Filed Oct. 27, 1951
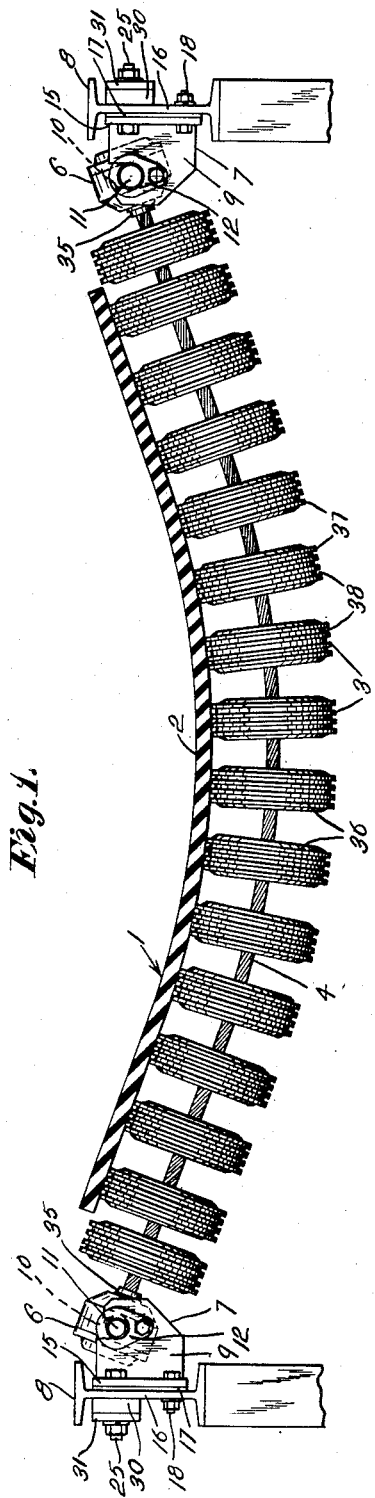
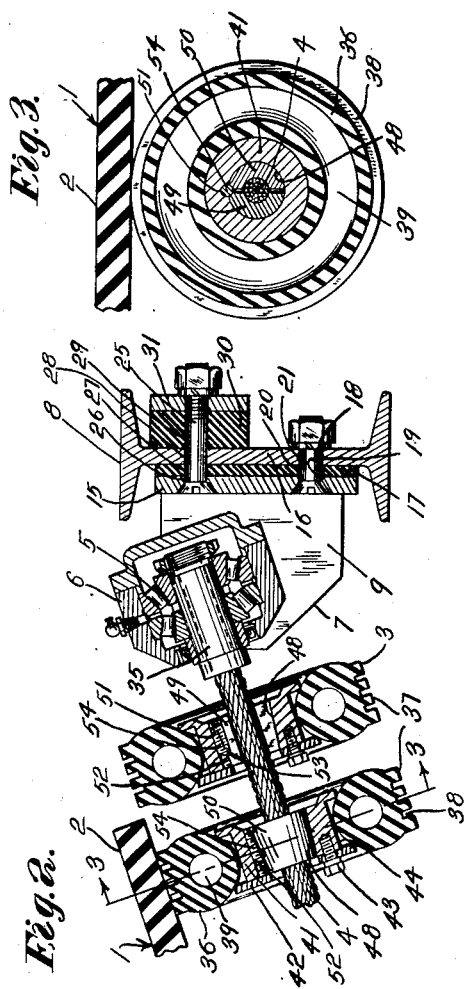
Inventor:
George Baechli.
by
Louis A. Maxson,
Attorney.

United States Patent Office 2,698,077
Patented Dec. 28, 1954

2,698,077

SUSPENSION TROUGHING IDLER

George Baechli, New Philadelphia, Ohio, assignor to Joy Manufacturing Company, Pittsburgh, Pa., a corporation of Pennsylvania Application October 27, 1951, Serial No. 253,530

6 Claims. (Cl. 198—192)

This invention relates to troughing idlers for conveyor belts and, more particularly, to troughing idlers of the suspension type.

An object of the invention is to provide an improved troughing idler. Another object of the invention is to provide an improved suspension-type troughing idler. A further object of the invention is to provide an improved suspension-troughing idler, the idler rollers of which are readily mounted upon the flexible supporting element but securely held to the latter. Still another object of the invention is to provide an improved troughing idler arrangement having a certain amount of shock absorbing capacity in the mounting of the idler roller supporting element.

In the accompanying drawings, in which for purposes of illustration, one illustrative embodiment of the invention is shown:

Fig. 1 is a transverse sectional view through the upper run of a belt conveyor showing an illustrative embodiment of the invention in supporting and guiding relation to such upper run.

Fig. 2 is an enlarged vertical sectional view on the vertical plane which includes the axis of the suspension idler showing bearing structure, bearing supporting structure, and details of idler construction and assembly on a flexible element which supports the idler rollers.

Fig. 3 is a section in the plane of the line 3—3 of Fig. 2.

Referring to the drawings and noting first Fig. 1, there will be seen a belt conveyor 1 having an upper troughed surface 2. The return run of this belt is not shown as it is unnecessary for the illustration of the present invention, but it will be appreciated of course that there is a return run, and that it will be supported by any suitable means for maintaining it substantially flat. The belt 1 is supported, as shown in Fig. 1, upon a series of idler rollers 3 mounted upon a flexible element 4, herein a section of wire cable. The flexible element 4 and the idler rollers mounted upon it are mounted in bearings 5 enclosed in trunnion supported housings 6 which are carried by brackets 7 secured to suitable support elements, herein I-beam sections 8. The brackets 7 include parallel appropriately shaped projecting plate portions 9 spaced apart to receive between them the bearing housings 6, and recessed or slotted at 10 to receive trunnions 11 carried by the bearing housings 6. Devices 12 are provided to keep the trunnions 11 from coming out of the slots 10, due to any whipping action of the belt. The brackets 7 include upright plate portions 15 to which the spaced upright plate portions 9 are secured in perpendicular relation to the portions 15. Between the portions 15 and the vertical portion 16 of the I-beams 8, there is arranged a suitable shock absorbing rubber or rubberized material pad 17. A short bolt and nut device 18 extends through a hole 19 in the portion 15, through a hole 20 in the pad 17 and a hole 21 in the section 16 of the I-beam and, upon tightening of this structure, the bottom portion of the pad 17 is firmly clamped. A longer nut and bolt device 25 is arranged near the upper endge of the plate portion 15. It extends through an opening 26 in this plate portion and an opening 27 in the upper side of the pad 17, through an opening 28 in the section 16 through an opening 29 in a further and thicker pad 30 of rubber or rubberized material, and through a clamping plate 31 which is arranged outside of the second rubber pad 30. This arrangement provides for a firm clamping of the upper side of the plate, but yet there is possible a little yielding, resulting in a slight tilting of the plate portion 15 relative to the upright I-beam which supports it. It will be understood that this structure is duplicated at the opposite ends of each suspension idler proper. The bearing 5 within the housing 6 is a double-taper roller bearing adapted to take thrust in both directions, and each surrounds a sleeve 35 rigidly connected to an end of the wire cable 4.

On the wire cable 4 there are arranged the idlers 3. These consist of rubber tires 36 having substantially cylindrical peripheries 37 about which annular grooves 38 are formed. The tires may be hollow, as indicated at 39, and they are mounted on a flanged element 41 to which a side plate 42 is secured by screws 43, the construction being such as to provide a groove 44 within which the inner periphery of the tire is received. Each member 41 has a frusto-conical bore 48 formed within it, and within this bore there are received the halves 49 and 50 of a frusto-conical plug element. A bore 51 is formed in part of each of the halves 49 and 50 and in part in the body of the member 41. The portion of the bore in the member 41 desirably extends completely through the latter and is provided with internal threads 52. The portion of the bore formed in the halves 49 and 50 is not internally threaded and does not extend completely through these halves in an axial direction, with the result that there is provided a shoulder 53 which is engageable by the end of a screw 54 whose threads interengage with the threads 52 in the portion of the bore 51 in the member 41. It will be appreciated that, upon screwing the screw 54 along the threads 52 in the member 41 its end will act on the shoulder 53 and push the halves 49 and 50 longitudinally of the axis of the idler into the conical bore 48 and thereby cause them to act as jaws and to clamp tightly upon the cable 4. The screws may desirably be of the socketed head type.

From what has been said, it will be appreciated that a very readily assembled structure is provided. The idler rollers may be located at any desirable distances along the flexible cable element 4, and may be tightly secured to it. The rubber tires 36 are replaceable when worn and their grooved cylindrical perpiheries provide very effective guidance for the lower side of the upper run of the belt. The bearings 5 support the cable precisely as regards longitudinal movement in either direction. The mounting on the I-beams 8 provides some resilience in the event that the suspension idler is located under a point of material discharge upon the belt 1. The use of the particular arrangement of bolts and rubber pads provides for an improved type of resilience. The trunnion mounting of the bearing housing 6 allows the suspension idler to hang without restraint. The whole structure is rugged, simple and effective.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. A suspension belt-troughing idler structure having brackets supporting bearings in inwardly tilted positions, a flexible element, of substantially uniform circumference throughout the flexing length thereof and of a length exceeding the width of the belt to be supported, extending between and rotatably supported by said bearings, and spaced idler rollers supported on and clamped upon said flexible element substantially from end to end of the portion of the latter between said bearings, said idler rollers each having for its releasable clamping upon said flexible element clamping means comprising portions relative movement between which in a direction longitudinal of the axis of said roller causes a radial clamping movement relative to said flexible element and which are freely movable when released along said flexible element to permit location of the idler rollers at the desired positions on said flexible element.

2. A suspension belt-troughing idler structure having spaced brackets supporting bearings in inwardly tilted positions, a flexible element extending between and rotatably supported by said bearings, and idler rollers having longitudinally split, tapered, flexible-element-engaging sleeves received in tapered bores coaxial with said flexible element in the assembled relation of said idler rollers to said flexible element and clamped by axial movement in said bores to said flexible element.

3. A suspension belt-troughing idler supporting structure including side frame elements in upright planes, yokes mounted on said frames and having plate portions adapted to be drawn horizontally towards said elements and providing in spaced relation to said plate portions pivotal supports for bearing devices, rubber pads between said plate portions and said frame elements, and clamping means for drawing said plate portions horizontally towards said frame elements and placing said rubber pads under compression.

4. A suspension belt-troughing idler supporting structure including side frame elements, yokes mounted on said frames and having plate portions adapted to be drawn towards said elements and providing in spaced relation to said plate portions pivotal supports for bearing devices, rubber pads between said plate portions and said frame elements, and clamping means for drawing said plate portions horizontally towards said frame elements and placing said rubber pads under compression, said clamping means including, further, second and thicker rubber pads at the opposite sides of said frame elements from said plate portions and tension elements adjacent said pivotal supports engaging and reacting through said second and thicker rubber pads upon the sides of said plate portions away from said first mentioned pads.

5. A suspension belt-troughing idler supporting structure including upright side frame elements, yokes mounted on said frames and having plate portions adapted to be drawn horizontally towards said elements and providing in spaced relation to said plate portions pivotal supporting means for bearing devices, rubber pads between said plate portions and said frame elements, and clamping means for drawing said plate portions horizontally towards said frame elements and placing said rubber pads under compression, said clamping means including tension elements adjacent said pivotal supporting means for bearing devices yieldingly drawing said plate portions towards said frame elements.

6. A suspension belt-troughing idler supporting structure including side frame elements having upwardly and downwardly extending mutually adjacent sides, bearing supports mounted on said adjacent sides and having plate portions adapted to be drawn horizontally towards said sides, resilient means between said plate portions and said frame elements at the sides of the latter at which said bearing supports are disposed, and clamping means for pressing said plate portions horizontally towards said frame elements and placing said resilient means under compression, said clamping means including devices respectively yieldingly and substantially unyieldingly pressing said plate portions towards said side frame elements.

References Cited in the file of this patent

UNITED STATES PATENTS

| Number | Name | Date |
| --- | --- | --- |
| 1,169,652 | Kimberly | Jan. 25, 1916 |
| 1,833,179 | Robins | Nov. 24, 1931 |
| 2,107,822 | Hahn | Feb. 8, 1938 |
| 2,271,166 | Weiss | Jan. 27, 1942 |

FOREIGN PATENTS

| Number | Country | Date |
| --- | --- | --- |
| 105,141 | Great Britain | Apr. 5, 1917 |
| 849,649 | France | Aug. 21, 1939 |